United States Patent
Toncich et al.

(10) Patent No.: US 8,145,141 B2
(45) Date of Patent: Mar. 27, 2012

(54) FREQUENCY AGILE TRANSCEIVER FOR USE IN A MULTI-BAND HANDHELD COMMUNICATIONS DEVICE

(75) Inventors: Stanley Slavko Toncich, San Diego, CA (US); Harris Smith Simon, Poway, CA (US); Aracely Williams, San Diego, CA (US)

(73) Assignee: QUALCOMM, Incorporated, San Diego, CA (US)

(*) Notice: Subject to any disclaimer, the term of this patent is extended or adjusted under 35 U.S.C. 154(b) by 1132 days.

(21) Appl. No.: 11/266,852

(22) Filed: Nov. 4, 2005

(65) Prior Publication Data
US 2006/0098723 A1    May 11, 2006

Related U.S. Application Data (60) Provisional application No. 60/625,224, filed on Nov. 5, 2004.

(51) Int. Cl.
*H04B 1/40* (2006.01)
*H04K 3/00* (2006.01)

(52) U.S. Cl. ......... 455/77; 455/87; 455/120; 455/127.3; 455/168.1; 455/234.1

(58) Field of Classification Search .................... 455/75, 455/77, 87, 120, 125, 127.3, 127.4, 168.1, 455/169.1, 191.2, 234.1, 234.2; 333/202, 333/205, 219
See application file for complete search history.

(56) References Cited

U.S. PATENT DOCUMENTS

| | | | |
|---|---|---|---|
| 4,459,571 A | 7/1984 | Fraser | 333/202 |
| 5,945,964 A | 8/1999 | DeGroot et al. | |
| 6,307,448 B1 | 10/2001 | Atokawa et al. | 33/202 |
| 6,639,491 B2 | 10/2003 | Toncich | |
| 6,690,176 B2 | 2/2004 | Toncich | |
| 6,690,251 B2 | 2/2004 | Toncich | |
| 6,727,786 B2 * | 4/2004 | Toncich | 333/219.2 |
| 6,728,517 B2 | 4/2004 | Sugar et al. | |
| 6,892,056 B1 * | 5/2005 | Garmonov et al. | 455/75 |
| 7,212,789 B2 | 5/2007 | Kuffner | |
| 7,636,554 B2 * | 12/2009 | Sugar et al. | 455/73 |
| 2003/0048153 A1 | 3/2003 | Liang et al. | 333/132 |
| 2003/0203743 A1* | 10/2003 | Sugar et al. | 455/550.1 |
| 2004/0127178 A1* | 7/2004 | Kuffner | 455/133 |
| 2004/0185795 A1* | 9/2004 | Shamsaifar et al. | 455/83 |

FOREIGN PATENT DOCUMENTS

| | | |
|---|---|---|
| EP | 0800224 | 3/1997 |
| JP | 2002208802 A | 7/2002 |
| JP | 2004320446 A | 11/2004 |
| WO | WO0110148 A1 | 2/2001 |
| WO | WO2004095727 A1 | 11/2004 |

OTHER PUBLICATIONS

International Search Report and Written Opinion—PCT/US05/040053, International Search Authority—European Patent Office—Feb. 28, 2006.

* cited by examiner

*Primary Examiner* — Lee Nguyen
(74) *Attorney, Agent, or Firm* — Nicholas J. Pauley; Ramin Mobarhan (57) ABSTRACT

A multi-band handheld communications device includes a transceiver including a transmitter having a transmit filter and a receiver having a receive filter, each of the transmit and receive filters having a bandpass region tunable across multiple bands, and a processor configured to select one of the multiple bands to operate the handheld communications device, and tune each of the transmit and receive filters based on the selected one of the multiple bands.

25 Claims, 7 Drawing Sheets

FREQUENCY AGILE TRANSCEIVER FOR USE IN A MULTI-BAND HANDHELD COMMUNICATIONS DEVICE

CLAIM OF PRIORITY UNDER 35 U.S.C. §119

The present application for patent claims priority to Provisional Application No. 60/625,224 entitled "A Frequency Agile Transceiver for Use in a Multi-Band Handheld Communications Device" filed Nov. 5, 2004, and assigned to the assignee hereof and hereby expressly incorporated by reference herein.

BACKGROUND

1. Field

The present disclosure relates generally to communications, and more specifically, to a frequency agile transceiver for use in a multi-band handheld communications device.

2. Background

The demand for wireless communications has led to the development of an ever increasing number of wireless services. Wireless services started with a blueprint that relied on cellular technology. Cellular technology is based on a topology in which the geographic coverage region is broken up into cells. Within each of these cells is a fixed radio transmitter and control equipment to communicate with mobile users. Cellular services, which operate between 824-894 MHz in the United States, originally used analog signals to support wireless communications. Today, various upgrades have been made to the cellular system to incorporate digital technology.

PCS (Personal Communications Services) followed years later. PCS is a digitally based communications system which uses a broadband operating frequency between 1850-1990 MHz to support voice, data and video applications. More recently, IMT (International Mobile Telecommunications) has been deployed to provide a framework for worldwide access by linking terrestrial and/or satellite networks. IMT has an operating band between 1920-2170 MHz. Thus, one can readily see that a mobile user will need a multi-band wireless communications device to access both cellular and PCS services. To make matters worse, frequency allocations for cellular and PCS, as well as other wireless services, are different throughout the world.

One of the advantages of a multi-band handheld wireless communications device is that it can be shipped anywhere in the world, reducing mass production volume costs and avoiding the need for differentiated product lines for devices going to different locations. Consumers may also appreciate a multi-band handheld wireless communications device to avoid purchasing multiple devices.

In current implementations of multi-band handheld wireless communication devices, a separate channel is provided for each wireless service. Each channel includes appropriate transmit and receive filters coupled to a duplexer. An RF switch may be used to connect the duplexer in the selected channel to the antenna. As the number of desired bands increases, the cost and complexity of realizing a multi-band handheld wireless communications device becomes prohibitive. The additional losses that arise from using an RF switch adversely impact system performance. Accordingly, there is a need in the art for an improved multi-band handheld wireless communications device.

SUMMARY

In one aspect of the present invention, a multi-band handheld communications device includes a transceiver including a transmitter having a transmit filter and a receiver having a receive filter, each of the transmit and receive filters having a bandpass region tunable across multiple bands, and a processor configured to select one of the multiple bands to operate the handheld communications device, and tune each of the transmit and receive filters based on the selected one of the multiple bands.

In another aspect of the present invention, a method of communicating, using a multi-band handheld communications device having a transmit filter and a receiver filter, includes selecting one of the multiple bands to operate the handheld communications device, and tuning each of the transmit and receive filters based on the selected one of the multiple bands.

In yet another aspect of the present invention, a multi-band handheld communications device includes a transceiver including a transmitter having means for generating a bandpass region tunable across multiple bands, and a receiver having means for generating a bandpass region tunable across multiple bands; means for selecting one of the multiple bands to operate the handheld communications device, and means for tuning the bandpass region in the transmitter and receiver.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

A multi-band handheld wireless communications device may be used to access a network or communicate with other mobile users using one or more wireless services. The term "handheld wireless communications device" refers to any type of device that is intended to be carried by a user and is capable of communicating through a wireless channel, including but not limited to a phone, a personal data assistant (PDA), a laptop, a modem, or any other similar device. The term "multi-band" refers to a handheld wireless communications device that can support multiple wireless services with at least two of the wireless services having different operating frequency bands.

The multi-band handheld wireless communications device may be designed to communicate over a code division multiple access (CDMA) network in the United States using cellular, PCS or IMT services. The multi-band handheld wireless communications device may also be capable of utilizing wireless services abroad, such as cellular services in Japan and PCS in Korea.

In the following detailed description, various techniques will be described in the context of a CDMA network. While these techniques may be well suited for use in this environment, those skilled in the art will readily appreciate that these techniques are likewise applicable to other wireless networks. Moreover, one or more examples of a multi-band handheld wireless communications device will be described with references to specific wireless services to illustrate various aspects of the present invention, with the understanding that these inventive aspects may be extended to any group of wireless services depending upon the particular need in the art.

Figure 1:
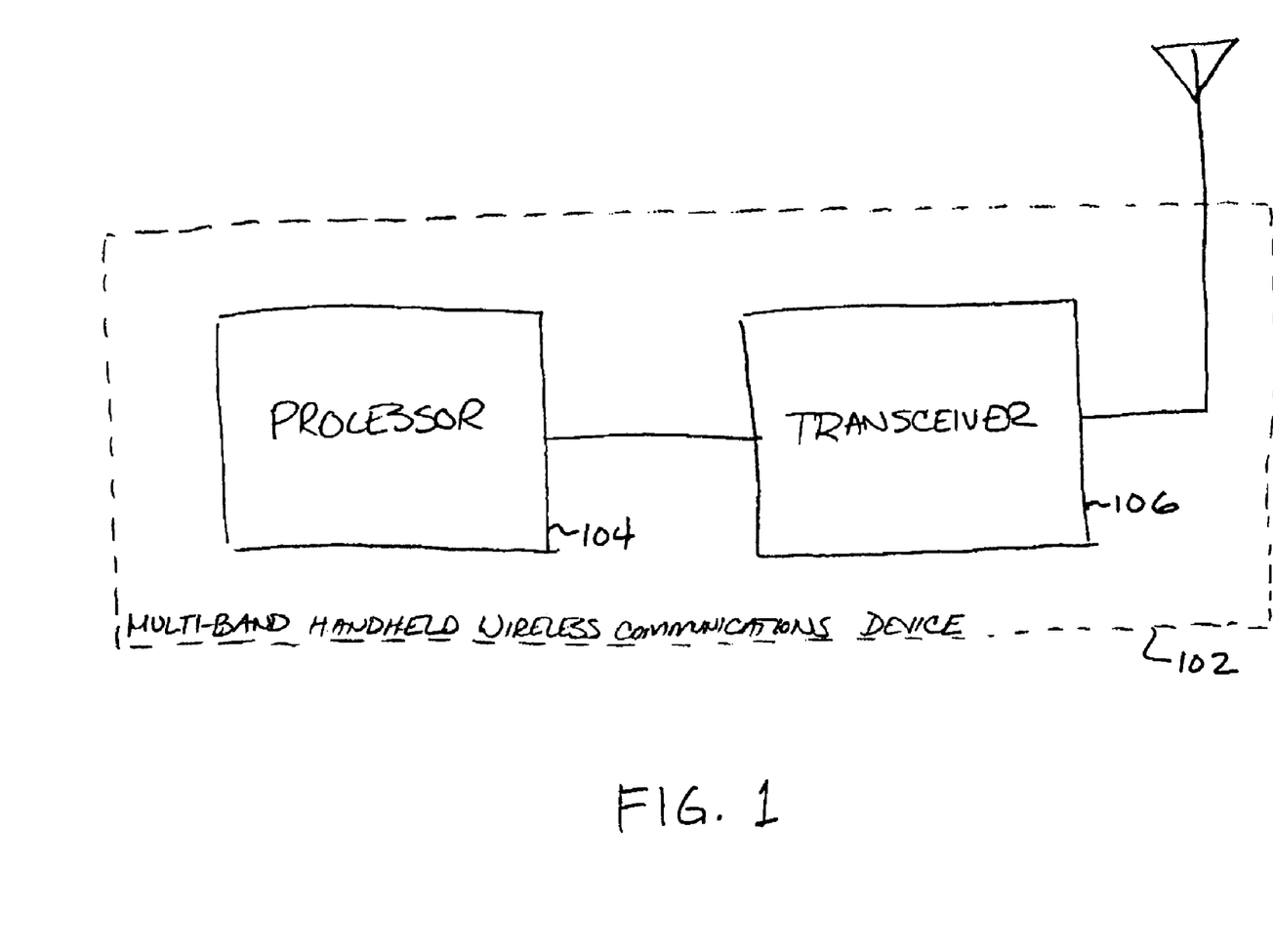
FIG. 1 is a conceptual block diagram illustrating an embodiment of a multi-band handheld wireless communications device.

FIG. 1 is a conceptual block diagram of a multi-band handheld wireless communications device 102 capable of accessing a network, such as a corporate intranet or the Internet, through an access point. The access point may include one or more fixed site base stations, each assigned to support communications in a specific geographic region of coverage.

The multi-band handheld wireless communications device may be managed by a software based processor 104, or any other suitable arrangement of hardware and/or software components. The processor 104 may include a microprocessor with system memory (not shown). The microprocessor may provide a platform to run software programs that, among other things, manage access to various wireless services supported by the network. The processor 104 may also provide various signal processing functions such as coding, modulation and spread-spectrum processing. These signal processing functions may also be performed by software running on the microprocessor, or alternatively, off loaded to a digital signal processor (DSP), or the like.

As indicated above, the processor 104 may be used to manage access to various wireless services supported by the network. When the user initiates a call, or launches an application that initiates a call, the microprocessor may access a roaming map in system memory to determine the appropriate wireless service to support the call. Depending on the geographic location of the user and the service provider, the processor 104 may select a wireless service from the roaming map and attempt to acquire the network using that service. By way of example, the processor 104 may attempt to acquire a CDMA network using cellular, PCS or IMT in the United States, cellular in Japan, or PCS in Korea. The selection of the wireless service may be transparent to the user by using a GPS (Global Positioning System) receiver (not shown) to determine the geographic location of the user. If the user is in a geographic region having multiple wireless services available, the processor 104 may employ an algorithm to select one. The algorithm may be based on the service provider's preference, the bandwidth requirements of the user, the network traffic at the time, or any other selection criteria. Alternatively, the user may be required to program his or her location into the multi-band handheld wireless communications device and/or the preferred wireless service. In any event, once the processor 104 selects the wireless service from the roaming map, the processor 104 generates a set of tuning signals associated with that selection. The tuning signals may be provided to a frequency agile transceiver 106.

The transceiver 106 may be designed for full-duplex or half-duplex operation depending on the particular application. A wireless telephone, for example, may employ a transceiver with full-duplexer operation so that both parties on the call can speak at once. To achieve full-duplex operation, the transmit and receive frequencies are typically offset. By way of example, in the U.S. cellular band, a wireless communications device uses frequencies in the range of 824-849 MHz to transmit to the base station, and the base station uses frequencies in the range of 869-894 MHz to transmit to the wireless communications device.

Figure 2:
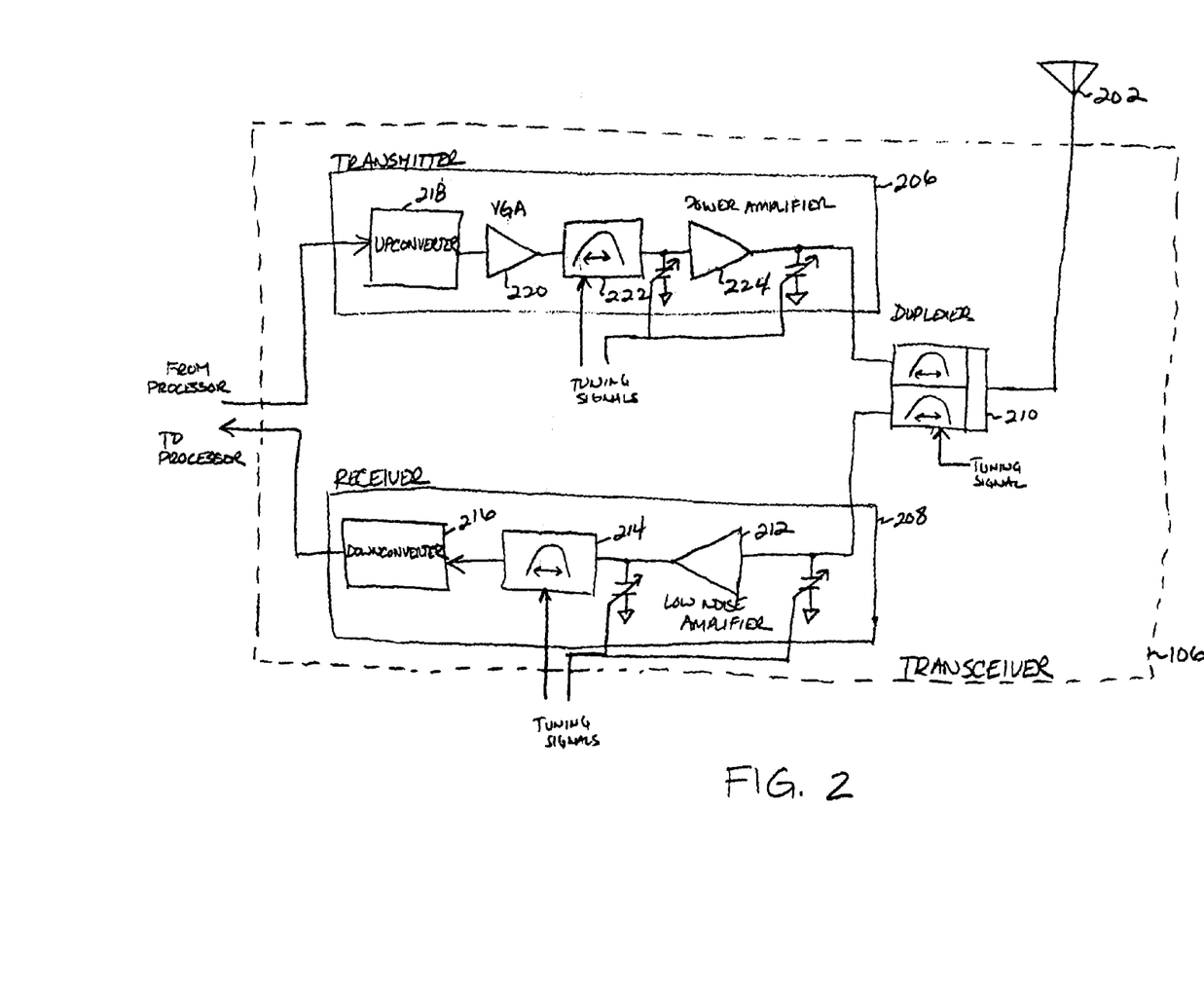
FIG. 2 is a functional block diagram illustrating an embodiment of a frequency agile transceiver for use in a multi-band handheld wireless communications device.

FIG. 2 is a functional block diagram of a frequency agile transceiver which may be used in the multi-band handheld wireless communications device discussed thus far. The frequency agile transceiver 106 may be used to provide lower loss and improved rejection over narrow bands around the desired transmit and receive frequencies. This improved performance may allow for improved standby and talk times in the multi-band handheld wireless communications device because of reduced power consumption.

The transceiver 106 may use a direct conversion architecture to reduce both circuit complexity and power consumption, but the inventive concepts described throughout this disclosure are in no way limited to such an architecture. The transceiver may be coupled to an antenna 202. The antenna 202 may be a broadband antenna, or alternatively include a tunable antenna matching circuit (not shown). In the latter embodiment of the antenna 202, one or more of the tuning signals generated by the processor 104 may be used to tune the antenna matching circuit in accordance with the wireless service selected by the processor 104.

The following description of the transceiver will be simplified to emphasize the inventive concepts without unnecessary detail. The actual implementation of the transceiver may be more complex, and may include, by way of example, a complex (I-Q) architecture, which is well known in the art, and therefore, will not be discussed. In addition, various amplifying and filtering stages that might be used during actual implementation that are not pertinent to the invention will be omitted. It is understood that those skilled in the art will be able to design and construct actual transceivers in accordance with the principles set forth herein.

Referring to FIG. 2, the transceiver 106 may include a transmitter 206 and receiver 208 coupled to the antenna 202 through a duplexer 210. In the full-duplex mode of operation, the duplexer 210 uses a tunable transmit filter between the transmitter 206 and the antenna 202, and a tunable receive filter between the antenna 202 and the receiver 208. Each filter may be individually tuned to the transmit or receive operating frequency for the wireless service selected by the processor 104. In particular, one or more of the tuning signals generated by the processor 104 may be used to tune the filters in the duplexer 208.

The receiver 208 is used to detect desired signals in the presence of noise and interference, and to amplify those signals to a level where information contained in the received transmission can be processed. More specifically, the signal received by the antenna 202 may be coupled through the duplexer 210 to a tunable low noise amplifier 212 at the front end of the receiver 208. The low noise amplifier 212 should provide high gain with good noise figure performance. A tunable filter 214 may be used to reject out of band signals produced by the low noise amplifier 212. A downconverter 216 may be used to convert the signal from Radio Frequency (RF) to baseband and provide the baseband signal to the processor 104. One or more of the tuning signals generated by the processor 104 may be used to tune the low noise amplifier 212 and the filter 214 to the frequency band for the wireless service selected by the processor 104.

The transmitter 206 is used to modulate a carrier signal with baseband information generated by the processor 104, and amplify the modulated carrier to a power level sufficient for radiation into free space through the antenna 202. An upconverter 218 positioned at the front end of the transmitter 206 may be used to convert the baseband signal from the processor 104 to a RF signal. A variable gain amplifier 220 may be used to amplify the RF signal. A tunable filter 222 may be used to reject out of band signals produced by the VGA 218. A tunable power amplifier 224 may be used to amplify the RF signal from the tunable filter 222 to a level suitable for transmission. The output of the power amplifier 224 may be provided to the antenna 202 through the duplexer 210. One or more of the tuning signals generated by the processor 104 may be used to tune the filter 222 and the power amplifier 224 to the frequency band for the wireless service selected by the processor 104.

The tunable filters in the transceiver 106 may be implemented in a variety of ways. In at least one embodiment of the transceiver 106, tunable filters may be implemented using one or more variable capacitors. Variable capacitors may be constructed as thin film ferro-electric capacitors having a ferro-electric material sandwiched between two conductor plates. Ferro-electric materials are a class of materials, typically ceramic rare-earth oxides, whose prominent feature is that their dielectric constant changes in response to an applied slowly varying (DC or low frequency) electric field. Since the capacitance of a capacitor depends on the dielectric constant of the material between the conductor plates, the ferro-electric capacitor is well suited for this application.

Thin film ferro-electric capacitors allow for the realization of low order, low loss filters that can be tuned over multiple CDMA bands. These capacitors offer better Q, thus lower loss, and better tuning range compared to varactor diodes in the frequency range of interest for CDMA. Unlike varactor diodes, ferro-electric capacitors may be operated at 0 volts DC bias. They may also may be integrated into a wide variety of ceramic substrate materials and may be stacked in series to reduce the RF voltage across each individual capacitor. Stacking is often used for linearity and power handling, both which tend to impact system performance.

Ferro-electric capacitors may also be used to tune the power amplifier 224 in the transmitter 206 and the low noise amplifier 212 in the receiver 208. In the embodiment of the transceiver 106 described in connection with FIG. 2, ferro-electric capacitors may be used to tune the power amplifier 224 and the low noise amplifier 212 over all frequency bands required by the wireless services supported by the network.

By way of example, in a multi-band handheld wireless communications device that supports cellular, PCS and IMT in the United States and abroad, the PA 224 and the LNA 212 may be implemented with ferro-electric capacitors to achieve a tuning range between 824-2170 MHz.

Figure 3:
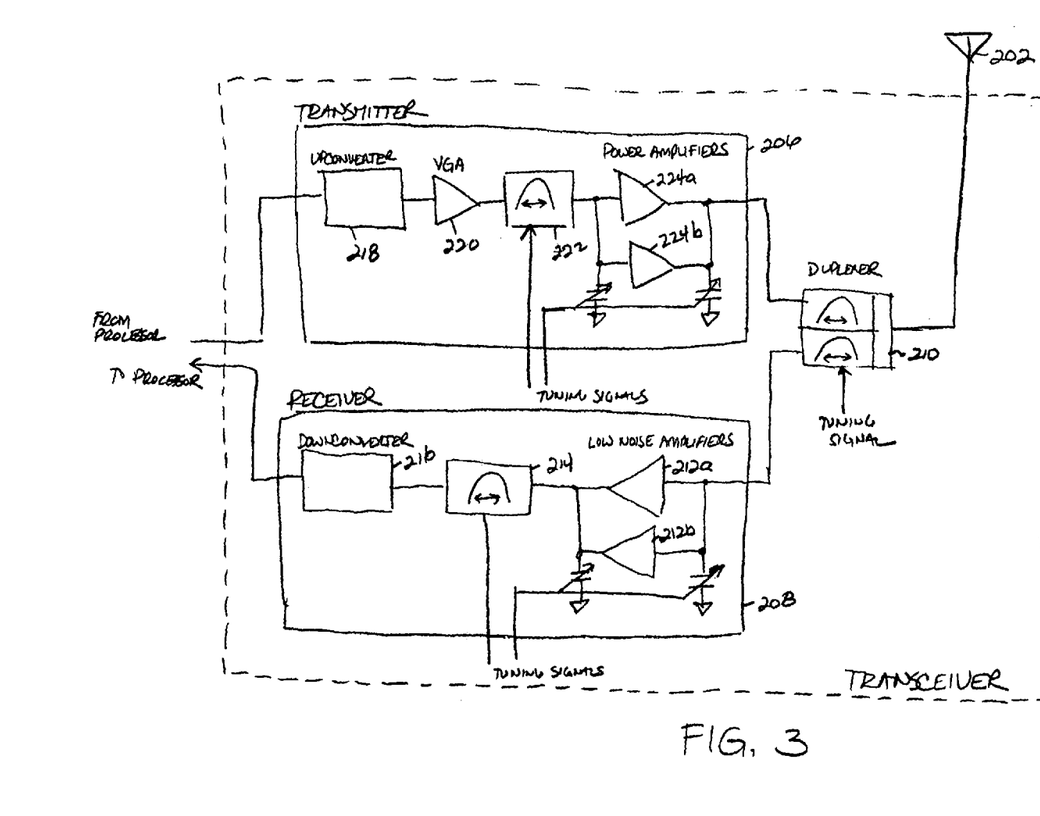
FIG. 3 is a functional block diagram illustrating an alternative embodiment of a frequency agile transceiver for use in a multi-band handheld wireless communications device.

In an alternative embodiment of the transceiver 106, several power amplifiers may be used in the transmitter 206 to reduce the tuning range requirements of each. Similarly, the receiver 208 may employ several low noise amplifiers to likewise reduce the tuning range of each. By reducing the tuning range of the amplifying devices in the receiver 208 and transmitter 206, improved linearity may be achieved. FIG. 3 is a functional block diagram of a transceiver having this configuration. In this configuration, two low noise amplifiers 212a, 212b are used in the receiver 208 and two power amplifiers 224a, 224b are used in the transmitter 206. One low noise amplifier 212a and one power amplifier 224a may be used to support the UHF band (824-960 MHz) and the other low noise amplifier 212b and power amplifier 224b may be used to support L-band (1710-2110 MHz). Those skilled in the art will be readily able to determine the appropriate number of tunable parallel amplifiers, in both the transmitter and receiver, to best meet the system requirements of any particular application.

Figure 4:
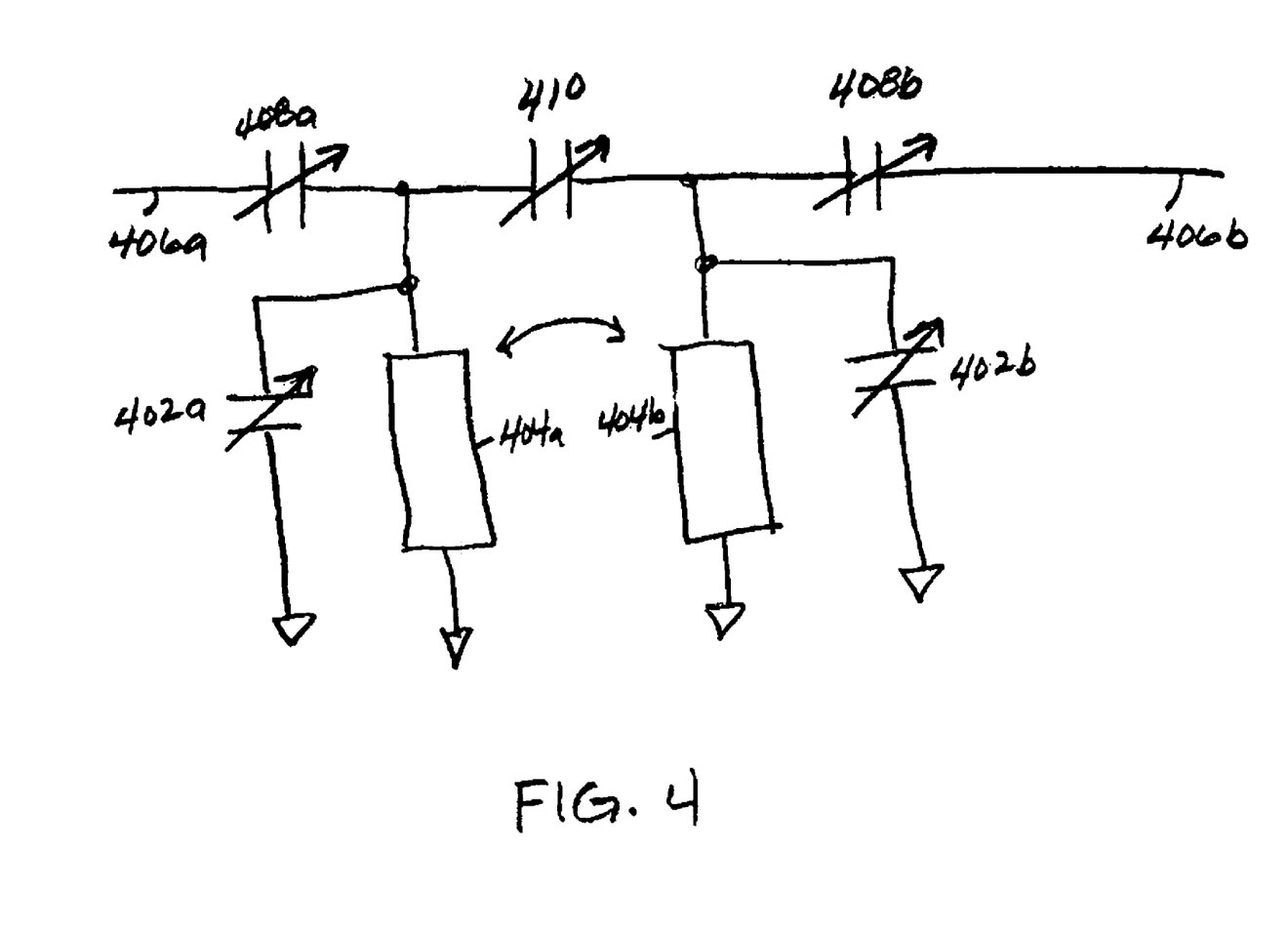
FIG. 4 is a schematic diagram illustrating an embodiment of a tunable filter for use in a frequency agile transceiver.

FIG. 4 is a schematic diagram of an illustrative embodiment of a tunable filter. The tunable filter may be used to reject out of band signals produced by the low noise amplifier 212 in the receiver 208 and the VGA 218 in the transmitter 206 (see FIG. 2). A pair of tunable filters may also be used in the duplexer 210, with one filter between the antenna 202 and receiver 208 and the other filter between the transmitter 206 and the antenna 202 (see FIG. 2).

Referring to FIG. 4, the tunable filter may be implemented as a $2^{nd}$ order filter. The first stage of the filter includes a ferro-electric capacitor 402a coupled in shunt with a resonator 404a. The second stage of the filter includes a second ferro-electric capacitor 402b coupled in shunt with a second resonator 404b. The resonators 404a, 404b are shown as ¼ wavelength short-circuited resonators, but may also be ½ wavelength open-circuited resonators. The resonators 404a, 404b may be either ceramic loaded resonators, slabline (monoblock), or stripline, just to mention a few.

An RF signal may be applied to the input port 406a and the filtered signal taken from the output port 406b. In the described embodiment, the tunable filter is symmetrical, and therefore, the input port 406a and the output port 406b are interchangeable. The tunable filter may include an input ferro-electric capacitor 408a in the first stage and an output ferro-electric capacitor 408b in the second stage. A variable DC voltage may be applied to the ferro-electric capacitors 402a, 408b in the first stage and the ferro-electric capacitors 402b, 408b in the second stage to tune the filter. An additional ferro-electric capacitor 410 may be provided for impedance matching between the resonators 404a, 404b to create the desired filter response. The variable DC voltage applied to the ferro-electric capacitors may be provided from the processor as tuning signals based on the wireless service selected by the processor.

The configuration of the $2^{nd}$ order filter in FIG. 4 creates a high or low side zero by the addition of electromagnetic coupling along the entire length of the resonators 404a, 404b. A low side transmission zero in the receiver or a high side transmission zero in the transmitter may be achieved by adjusting the electromagnetic coupling between the resonators 404a, 404b and the capacitance of the ferro-electric capacitor 410.

Figure 5:
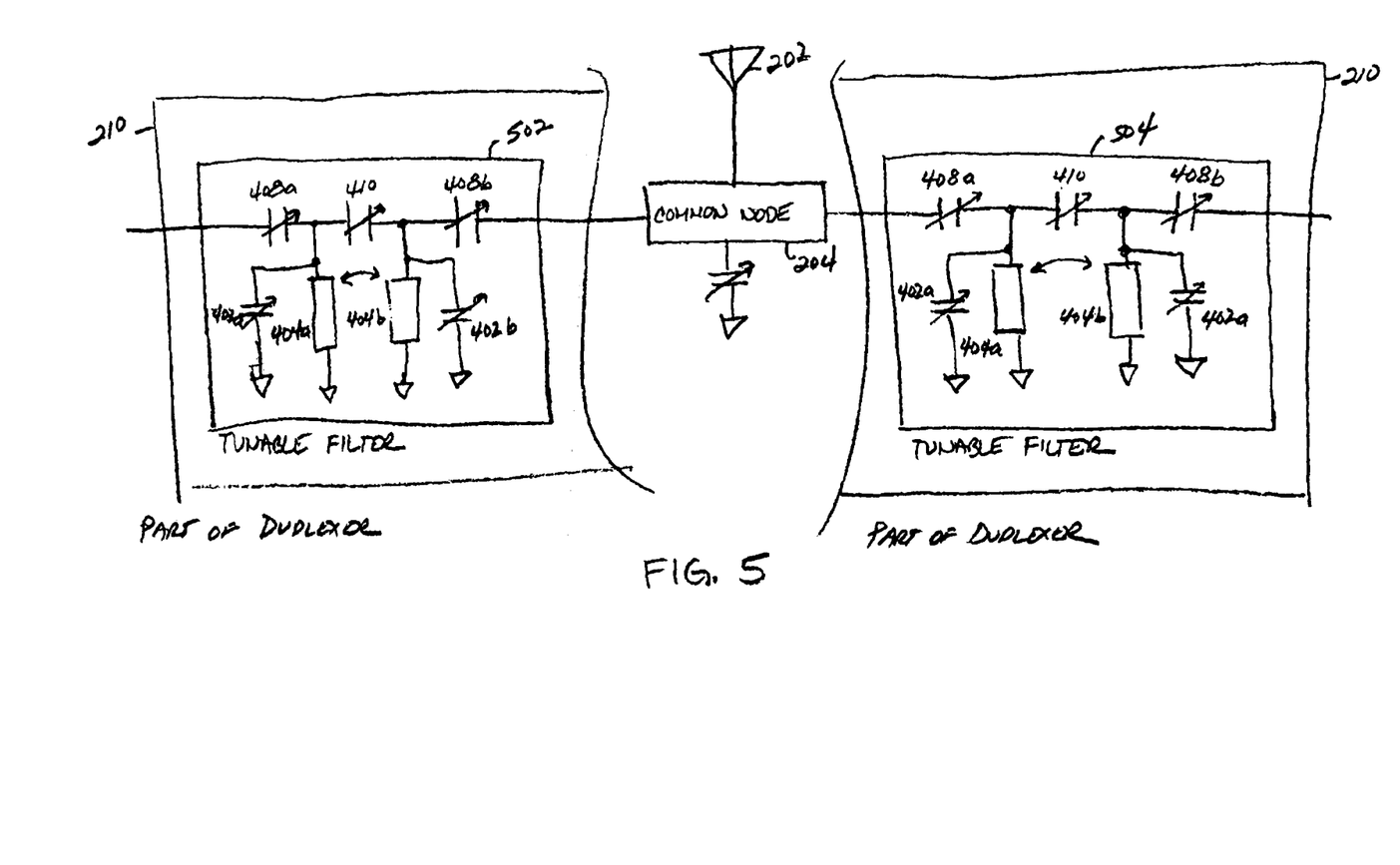
FIG. 5 is a schematic diagram illustrating an embodiment of a duplexer coupled to an antenna in a multi-band handheld communications device.

FIG. 5 is a schematic diagram of an illustrative embodiment of the duplexer and antenna. The duplexer 210 may include a pair of tunable filters 502, 504 having the construction described in connection with FIG. 4. The first tunable filter 502 may be coupled between the transmitter 206 and the antenna 202, and the second tunable filter 504 may be coupled between the antenna 202 and the receiver 208. The tunable filters 502, 504 in the duplexer 210 may be coupled to the antenna 202 through a common node 506. The common node 506 may include a tunable impedance matching circuit if the antenna is not broadband. The impedance matching circuit may be implemented with a combination of tunable low-pass and/or high-pass filters by means well known in the art. These low-pass and/or high-pass filters may include variable ferro-electric capacitors. In at least one embodiment of the transceiver, a single DC voltage in the form of a tuning signal from the processor may be used to tune the matching circuit.

As discussed earlier, the low-noise amplifier 212 in the receiver 208, and the power amplifier 224 in the transmitter 206 may also be tunable. These amplifiers may be implemented in a variety of ways. For the purposes of explanation, each amplifier will be described in simplified form to emphasize the inventive concepts without unnecessary detail. The actual implementation of the amplifiers may include multiple stages with any number of active and passive elements depending upon the overall design constraints. Those stages and elements not necessary to understanding the operation of the low-noise amplifier or power amplifier will be omitted. It is understood that those skilled in the art will be able to design and construct actual amplifiers in accordance with the principles set forth herein.

Figure 6:
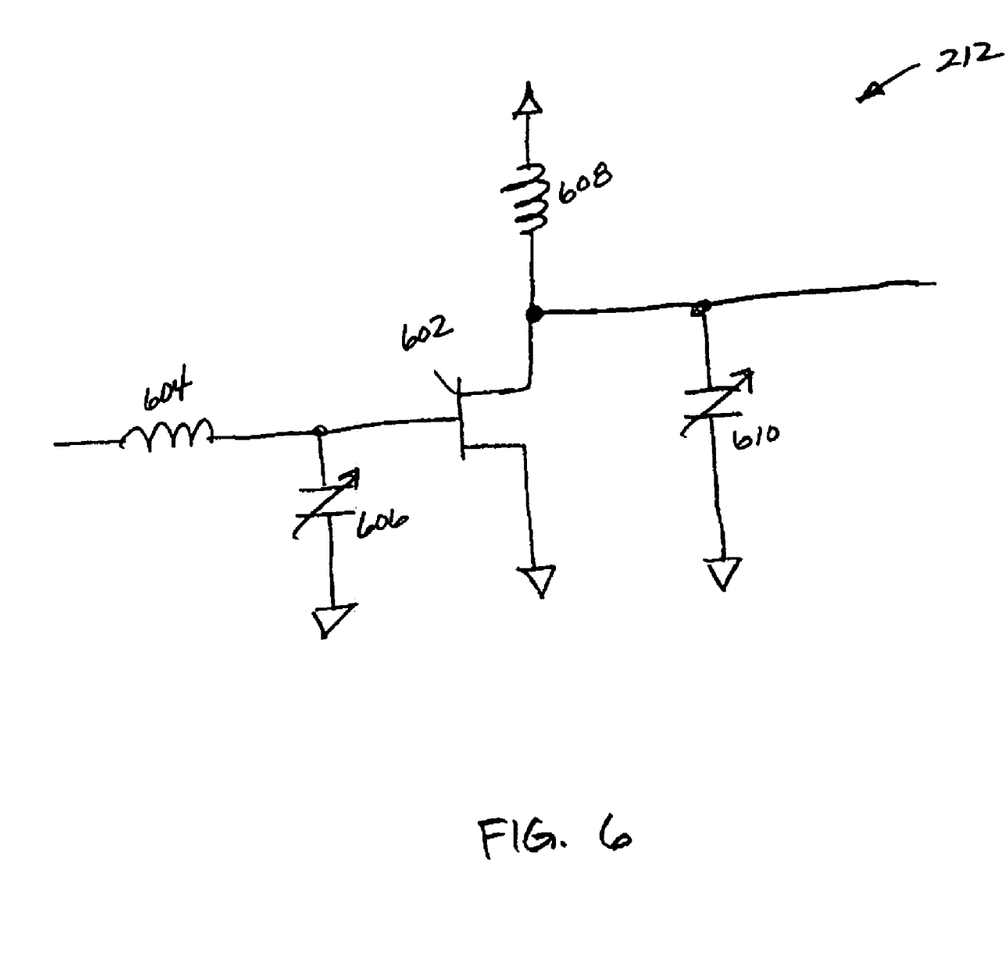
FIG. 6 is a schematic diagram illustrating an embodiment of a low noise amplifier for use in a frequency agile transceiver.

FIG. 6 is a schematic block diagram of an illustrative embodiment of a low-noise amplifier. The low noise amplifier 212 may be implemented with a transistor, such as a field effect transistor (FET) 602. A low-pass filter may be used at the input to the low noise amplifier 212. The low-pass filter may be implemented with a series inductor 604 coupled to the gate of the FET 602 and a shunt variable ferro-electric capacitor 606. The output circuit of the low noise amplifier 212 may also include a low pass filter with an inductor 608 coupled between the power source and the drain of the FET 602 and a shunt variable ferro-electric capacitor 610, with the output taken from the drain of the FET 602. A DC voltage may be provided as a tuning signal from the processor. The DC voltage may be used to adjust the capacitance of both capacitors 606, 610, and thereby, change the cut-off frequency of the low-pass filters.

Figure 7:
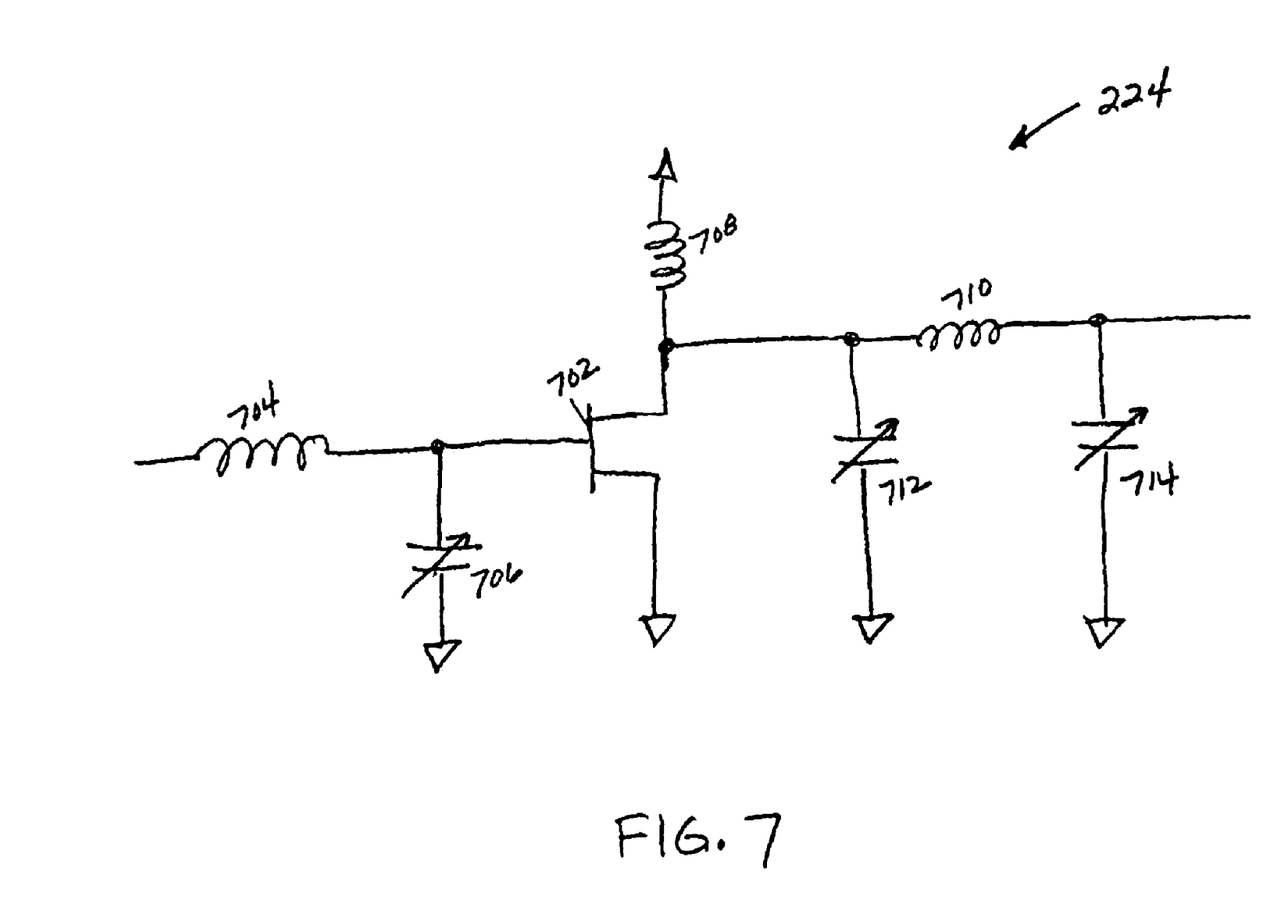
FIG. 7 is a schematic diagram illustrating an embodiment of a power amplifier for use in a frequency agile transceiver.

FIG. 7 is a schematic block diagram of an illustrative embodiment of a power amplifier. The power amplifier 224 may be implemented with a transistor, such as a field effect transistor (FET) 702. A low-pass filter may be used at the input to the power amplifier 224. The low-pass filter may be implemented with a series inductor 704 coupled to the gate of the FET 702 and a shunt variable ferro-electric capacitor 706. The output circuit of the power amplifier 224 may also include a low-pass filter with an inductor 708 coupled between the power source and the drain of the FET 602, a series inductor 710 from the drain of the FET 702 to the output, and a pair of shunt variable ferro-electric capacitors 712, 714, one on each side of the series inductor 710. A DC voltage may be provided as a tuning signal from the processor. The DC voltage may be used to adjust the capacitance of the capacitors 706, 712, 714, and thereby, change the cut-off frequency of the low-pass filters.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A multi-band handheld communications device, comprising:
   a transceiver including a transmitter having a transmit filter and a receiver having a receive filter, each of the transmit and receive filters having a bandpass region individually tunable between radio frequencies of separate multiple bands; and
   a processor configured to select one of the multiple bands to operate the handheld communications device, and tune each of the transmit and receive filters and tunable transmit and receive amplifiers respectively coupled thereto based on the selected one of the multiple bands.

2. The multi-band handheld communications device of claim 1 wherein each of the transmit and receive filters comprises a variable ferro-electric capacitor having a bias voltage input, the processor being further configured to tune each of the transmit and receive filters by adjusting its respective bias voltages.

3. The multi-band handheld communications device of claim 2 wherein the variable ferro-electric capacitor comprises a plurality of ferro-electric capacitors stacked in series.

4. The multi-band handheld communications device of claim 1 wherein each of the transmit and receive filters comprises first, second and third variable ferro-electric capacitors arranged in series, an electromagnetic resonator having first and second resonators, a fourth variable ferro-electric capacitor coupled in parallel with the first resonator between the first and second capacitors and a power supply return, and a fifth variable ferro-electric capacitor coupled in parallel with the second resonator between the second and third capacitors and the power supply return, each of the variable ferro-electric capacitors having a bias voltage input, the processor being further configured to tune each of the transmit and receive filters by adjusting its respective bias voltages.

5. The multi-band handheld communications device of claim 4 wherein for each of the transmit and receive filters, the processor is further configured to adjust a first bias voltage common to the first and third capacitors, a second bias voltage to the second capacitor, and a third bias voltage common to the fourth and fifth capacitors.

6. The multi-band handheld communications device of claim 1 further comprising a duplexer having a transmit filter coupled to the transmitter, and a receive filter coupled to the receiver, each of the transmit and receive filters in the duplexer having a bandpass region tunable between separate the multiple bands, and wherein the processor is further configured to tune each of the transmit and receive filters in the duplexer based on the selected one of the multiple bands.

7. The multi-band handheld communications device of claim 6 wherein the transmit filter in the transmitter, the receive filter in the receiver, and the transmit and receive filters in the duplexer each comprises a variable ferro-electric capacitor having a bias voltage input, the processor being further configured to tune each of the filters by providing their respective bias voltages.

8. The multi-band handheld communications device of claim 6 further comprising an antenna and a tunable common node, the duplexer being coupled to the antenna through the common node, and wherein the processor is further configured to tune the common node based on the selected one of the multiple bands.

9. The multi-band handheld communications device of claim 8 wherein the common node, the transmit filter in the transmitter, the receive filter in the receiver, and the transmit and receive filters in the duplexer each comprises a variable ferro-electric capacitor having a bias voltage input, the processor being further configured to tune the common node and each of the filters by adjusting their respective bias voltages.

10. The multi-band handheld communications device of claim 1 wherein the transmitter comprises the tunable transmit amplifier having an input coupled to the transmit filter, and the receiver comprises the tunable receive amplifier having an output coupled to the receive filter.

11. The multi-band handheld communications device of claim 10 wherein the transmit filter, the receive filter, the transmit amplifier and the receive amplifier each comprises a variable ferro-electric capacitor having a bias voltage input, the processor being further configured to tune each of the filters and amplifiers by adjusting their respective bias voltages.

12. The multi-band handheld communications device of claim 1 wherein the transmitter comprises first and second tunable transmit amplifiers coupled in parallel and having a common input coupled to the transmit filter, and wherein the receiver comprises first and second tunable receive amplifiers coupled in parallel and having a common output coupled to the receive filter, the first transmit and receive amplifiers each being tunable over a first portion of the multiple bands and the second transmit and receive amplifiers each being tunable over a second portion of the multiple bands different from the first portion, and wherein the processor is further configured to tune at least one of the amplifiers in both the receiver and transmitter based on the selected one of the multiple bands.

13. A method of communicating using a multi-band handheld communications device, the communications device comprising a transmitter having a transmit filter coupled to a tunable transmit amplifier and a receiver having a receive filter coupled to a tunable receive amplifier, each of the transmit and receive filters having a bandpass region individually tunable between radio frequencies of separate multiple bands, the method comprising:
  selecting one of the multiple bands to operate the handheld communications device; and
  tuning each of the transmit and receive filters and the tunable transmit and receive amplifiers based on the selected one of the multiple bands.

14. The method of claim 13 wherein each of the transmit and receive filters comprises a variable ferro-electric capacitor having a bias voltage input, and wherein the transmit and receive filters are tuned by adjusting their respective bias voltages.

15. The method of claim 14 wherein the variable ferro-electric capacitor comprises a plurality of ferro-electric capacitors stacked in series.

16. The method of claim 13 wherein each of the transmit and receive filters comprises first, second and third variable ferro-electric capacitors arranged in series, an electromagnetic resonator having first and second resonators, a fourth variable ferro-electric capacitor coupled in parallel with the first resonator between the first and second capacitors and a power supply return, and a fifth variable ferro-electric capacitor coupled in parallel with the second resonator between the second and third capacitors and the power supply return, each of the variable ferro-electric capacitors having a bias voltage input, and wherein the transmit and receive filters are tuned by adjusting their respective bias voltages.

17. The method of claim 16 wherein each of the transmit and receive filters are tuned by adjusting a first bias voltage common to the first and third capacitors, adjusting a second bias voltage to the second capacitor, and adjusting a third bias voltage common to the fourth and fifth capacitors.

18. The method of claim 13 wherein the handheld communications device further comprising a duplexer having a transmit filter coupled to the transmitter, and a receive filter coupled to the receiver, each of the transmit and receive filters in the duplexer having a bandpass region tunable between separate the multiple bands, the method further comprising tuning each of the transmit and receive filters in the duplexer based on the selected one of the multiple bands.

19. The method of claim 18 wherein the transmit filter in the transmitter, the receive filter in the receiver, and the transmit and receive filters in the duplexer each comprises a variable ferro-electric capacitor having a bias voltage input, and wherein each of the filters are tuned by adjusting their respective bias voltages.

20. The method of claim 18 wherein the handheld communication device further comprises an antenna and a tunable common node, the duplexer being coupled to the antenna through the common node, the method further comprising tuning the common node based on the selected one of the multiple bands.

21. The method of claim 20 wherein the common node, the transmit filter in the transmitter, the receive filter in the receiver, and the transmit and receive filters in the duplexer each comprises a variable ferro-electric capacitor having a bias voltage input, and wherein the common node and the filters are tuned by adjusting their respective bias voltages.

22. The method of claim 13 wherein the transmitter comprises the tunable transmit amplifier having an input coupled to the transmit filter, and the receiver comprises the tunable receive amplifier having an output coupled to the receive filter.

23. The method of claim 22 wherein the transmit filter, the receive filter, the transmit amplifier and the receive amplifier each comprises a variable ferro-electric capacitor having a bias voltage input, and wherein each of the filters and amplifiers are tuned by adjusting its respective bias voltages.

24. The method of claim 13 wherein the transmitter comprises first and second tunable transmit amplifiers coupled in parallel and having a common input coupled to the transmit filter, and wherein the receiver comprises first and second tunable receive amplifiers coupled in parallel and having a common output coupled to the receive filter, the first transmit and receive amplifiers each being tunable over a first portion of the multiple bands, and the second transmit and receive amplifiers each being tunable over a second portion of the multiple bands different from the first portion, the method further comprising tuning at least one of the amplifiers in both the receiver and transmitter based on the selected one of the multiple bands.

25. A multi-band handheld communications device, comprising:
a transceiver including a transmitter coupled to a tunable transmit amplifier and having means for generating a bandpass region individually tunable between radio frequencies of separate multiple bands, and a receiver coupled to a tunable receive amplifier and having means for generating a bandpass region individually tunable between radio frequencies of separate the multiple bands;
means for selecting one of the multiple bands to operate the handheld communications device; and
means for tuning the bandpass region in the transmitter and receiver.

\* \* \* \* \*